US011333835B2

(12) United States Patent
Jian (10) Patent No.: US 11,333,835 B2
(45) Date of Patent: May 17, 2022

(54) MICROFABRICATION METHOD FOR OPTICAL COMPONENTS

(71) Applicant: Arrayed Fiberoptics Corporation, Sunnyvale, CA (US)

(72) Inventor: Benjamin B. Jian, Sunnyvale, CA (US)

(73) Assignee: Arrayed Fiberoptics Corporation, Sunnyvale, CA (US)

( * ) Notice: Subject to any disclaimer, the term of this patent is extended or adjusted under 35 U.S.C. 154(b) by 68 days.

(21) Appl. No.: 16/716,519

(22) Filed: Dec. 17, 2019

(65) Prior Publication Data
US 2021/0011227 A1    Jan. 14, 2021

Related U.S. Application Data

(63) Continuation-in-part of application No. 16/505,673, filed on Jul. 8, 2019, now Pat. No. 10,545,294.

(51) Int. Cl.
*G02B 6/38* (2006.01)
*G02B 1/11* (2015.01)

(52) U.S. Cl.
CPC ............ *G02B 6/3826* (2013.01); *G02B 1/11* (2013.01); *G02B 6/3854* (2013.01);
(Continued)

(58) Field of Classification Search
CPC ...... G02B 1/11; G02B 6/3672; G02B 6/3818; G02B 6/3826; G02B 6/3854;
(Continued)

(56) References Cited

U.S. PATENT DOCUMENTS

| 4,148,554 A | 4/1979 | Magnusson |
| 4,850,664 A | 7/1989 | Iri |

(Continued)

FOREIGN PATENT DOCUMENTS

| CN | 1489714 A | 4/2004 |
| CN | 1580843 A | 2/2005 |

(Continued)

OTHER PUBLICATIONS

Gebizlioglu et al., "Materials issues in the development and use of lightguide fibers, cables, and components," Proc. SPIE 10295, Reliability of Optical Fibers and Optical Fiber Systems: A Critical Review, 1029505 (Sep. 28, 1999); doi: 10.1117/12.361080 (Year: 1999).*

(Continued)

*Primary Examiner* — Peter Radkowski (74) *Attorney, Agent, or Firm* — Idea Intellectual Limited; Margaret A. Burke; Sam T. Yip (57) ABSTRACT

A ferrule mold having a reverse-image of a through-hole array for optical fibers is formed. A non-polymeric ferrule material is deposited in the reverse-image mold, followed by removing the mold to create a multi-fiber connector ferrule having at least two fiber through-holes. An optical fiber is inserted in each through-hole until each fiber endface is positioned approximately even with a connection surface of the ferrule. A fiber recess for each of the optical fibers is formed such that each fiber is recessed from the multi-fiber ferrule connection surface by a distance of at least 0.1 micron. The recess may be formed by differential polishing of the non-polymeric ferrule and endfaces of the optical fibers. Alternatively, a layer of spacer material may be deposited over the multi-fiber ferrule connection surface. An antireflection coating is deposited over the ends of the recessed fibers.

23 Claims, 10 Drawing Sheets

(52) U.S. Cl.
CPC ......... *G02B 6/3863* (2013.01); *G02B 6/3865* (2013.01); *G02B 6/3882* (2013.01)

(58) Field of Classification Search
CPC .. G02B 6/3863; G02B 6/3865; G02B 6/3882; G02B 6/3885; G02B 6/3696; G02B 6/3692; G02B 6/3684
See application file for complete search history.

(56) References Cited

U.S. PATENT DOCUMENTS

| | | | |
|---|---|---|---|
| 5,062,378 A | 11/1991 | Bateman | |
| 5,082,378 A | 1/1992 | Muller | |
| 5,092,378 A | 3/1992 | Dunham | |
| 5,093,881 A | 3/1992 | Bortolin | |
| 5,146,524 A | 9/1992 | Berg | |
| 5,319,733 A * | 6/1994 | Emmons | G02B 6/266 385/140 |
| 5,588,077 A | 12/1996 | Woodside | |
| 5,631,985 A * | 5/1997 | Yamada | G02B 6/3873 385/59 |
| 5,687,269 A | 11/1997 | Furuya et al. | |
| 5,707,565 A * | 1/1998 | Suzuki | G02B 6/3865 249/142 |
| 5,734,770 A | 3/1998 | Carpenter et al. | |
| 5,754,721 A | 5/1998 | Pan | |
| 5,796,894 A * | 8/1998 | Csipkes | G02B 6/3821 385/38 |
| 5,855,503 A * | 1/1999 | Csipkes | B24B 19/226 451/41 |
| 6,074,100 A | 6/2000 | Rowland | |
| 6,179,483 B1 * | 1/2001 | Kanazawa | G02B 6/4207 385/66 |
| 6,257,770 B1 | 7/2001 | Sato | |
| 6,309,488 B1 | 10/2001 | Yang et al. | |
| 6,355,301 B1 | 3/2002 | Miller | |
| 6,416,236 B1 * | 7/2002 | Childers | G02B 6/3835 385/84 |
| 6,419,810 B1 | 7/2002 | Tanaka | |
| 6,474,879 B1 | 11/2002 | Warnes | |
| 6,535,668 B2 | 3/2003 | Liu et al. | |
| 6,599,030 B1 | 7/2003 | Millmann | |
| 6,715,932 B2 | 4/2004 | Kuroha | |
| 6,749,347 B1 * | 6/2004 | Ichihara | G02B 6/4204 385/88 |
| 6,913,399 B2 | 7/2005 | Ho | |
| 6,920,255 B2 | 7/2005 | Hasui et al. | |
| 6,934,087 B1 | 8/2005 | Gutierrez et al. | |
| 6,981,804 B2 | 1/2006 | Jian | |
| 7,090,761 B2 * | 8/2006 | Tanaka | C25D 1/02 204/198 |
| 7,116,884 B2 * | 10/2006 | Nakajima | G02B 6/3672 385/137 |
| 7,295,743 B2 * | 11/2007 | Yatsuda | G02B 6/138 385/129 |
| 7,306,376 B2 | 12/2007 | Scerbak et al. | |
| 7,334,944 B1 | 2/2008 | Uhlhorn | |
| 7,507,031 B2 | 3/2009 | Kawasaki | |
| 8,104,973 B2 | 1/2012 | Howard | |
| 8,104,974 B1 * | 1/2012 | Gurreri | G02B 6/382 385/72 |
| 8,753,021 B1 * | 6/2014 | Baca | G02B 6/3861 385/80 |
| 2001/0022879 A1 | 9/2001 | Wu | |
| 2001/0051025 A1 | 12/2001 | Wada | |
| 2002/0061172 A1 | 5/2002 | Kuroha | |
| 2003/0007758 A1 * | 1/2003 | Rose | G02B 6/3833 385/115 |
| 2003/0068121 A1 | 4/2003 | Matsuura | |
| 2003/0123837 A1 | 7/2003 | Yamamoto | |
| 2003/0134577 A1 | 7/2003 | Coad | |
| 2003/0152334 A1 | 8/2003 | Millmann | |
| 2003/0201462 A1 * | 10/2003 | Pommer | G02B 6/4201 257/200 |
| 2003/0215206 A1 * | 11/2003 | Nakajima | G02B 6/3672 385/137 |
| 2003/0235374 A1 | 12/2003 | Luther | |
| 2004/0007690 A1 | 1/2004 | Snider | |
| 2004/0028344 A1 * | 2/2004 | Kang | G02B 6/3834 385/60 |
| 2004/0065548 A1 * | 4/2004 | Kaku | C25D 1/02 205/75 |
| 2004/0120654 A1 * | 6/2004 | Kevern | G02B 6/3885 385/78 |
| 2004/0222099 A1 * | 11/2004 | Tanaka | C25D 1/02 205/73 |
| 2004/0258363 A1 * | 12/2004 | Shigihara | G02B 6/266 385/73 |
| 2005/0018975 A1 | 1/2005 | Ho | |
| 2005/0058402 A1 * | 3/2005 | Ernst | G02B 6/4277 385/56 |
| 2005/0079285 A1 | 4/2005 | Takahashi | |
| 2005/0271328 A1 | 12/2005 | Ohtsu et al. | |
| 2006/0013537 A1 | 1/2006 | Miyake | |
| 2006/0024012 A1 * | 2/2006 | Yatsuda | G02B 6/138 385/129 |
| 2006/0039658 A1 * | 2/2006 | Furuyama | G02B 6/25 385/90 |
| 2006/0072879 A1 | 4/2006 | Yang | |
| 2007/0172174 A1 | 7/2007 | Scerbak et al. | |
| 2007/0206904 A1 | 9/2007 | Sezerman | |
| 2008/0095504 A1 | 4/2008 | Kawasaki | |
| 2008/0193086 A1 | 8/2008 | Howard | |
| 2009/0016683 A1 * | 1/2009 | Zheng | G02B 6/3822 385/78 |
| 2011/0026884 A1 | 2/2011 | Hikosaka | |
| 2011/0262076 A1 | 10/2011 | Hall | |
| 2012/0027356 A1 * | 2/2012 | Gurreri | G02B 6/382 385/60 |
| 2013/0163930 A1 * | 6/2013 | Jian | G02B 6/3882 385/60 |
| 2014/0105543 A1 | 4/2014 | de Jong | |
| 2014/0270651 A1 * | 9/2014 | Kadar-Kallen | G02B 6/3861 385/79 |
| 2015/0331201 A1 * | 11/2015 | Takano | G02B 6/3875 385/71 |
| 2017/0248761 A1 * | 8/2017 | Jian | G02B 6/3846 |

FOREIGN PATENT DOCUMENTS

| | | |
|---|---|---|
| CN | 106547053 A | 3/2017 |
| CN | 108490550 A | 9/2018 |
| CN | 108983361 A | 12/2018 |
| JP | 5688217 U * | 12/1979 |
| JP | 2003294983 A | 10/2003 |

OTHER PUBLICATIONS

Harding et al., Ordered Silicon Pillar Arrays Prepared by Electrochemical Micromachining: Substrates for High-Efficiency Cell Transfection, ACS Appl. Mater. Interfaces 2016, 8, 29197-29202 (Year: 2016).*

Lindmark, Eric, Variation in Linear Apex Offset Measurements of Angled Fiber Optic Connectors, http://www.prometoptics.com/wp-content/uploads/2017/08/Variation_in_Apex_Offset_of_APC_Connectors.pdf (Year: 2017).*

Ohmura et al., High-Precision 32 Mechanically Transferable Ferrule for Single-Mode Fiber, INFOCOMMUNICATIONS, Sumitomo Electric, Technical Reviews, Apr. 2016 No. 82 (Year: 2016).*

Xu et al., Silicon nanoporous pillar array: a silicon hierarchical structure with high light absorption and triple-band photoluminescence, Optics Express, V. 16, No. 5, 2008 (Year: 2008).*

Fons, Fred A., "How to properly polish fiber-optic connectors", Lightwave, 1997; available at http://www.lightwavonline.com/articles/1997/02/how-to-properly-polish-fiber-optic-connectors-53668932.html.

(56) References Cited

OTHER PUBLICATIONS

Gebizlioglu et al., "Materials issues in the development and use of lightguide fibers, cabled, and components", Proc. SPIE 10295 Reliability of Optical Fibers and Optical Fiber Systems: A critical Review, 1029505, Sep. 28, 1999.
Kihara et al., "Fault analysis: Optical Performance Investigation of Fiber Connections With Imperfect Physical contact". Optics Letters, vol. 36, No. 24, 2011.
Suzuki et al., "Low Insertion- and High Return-Loss Optical Connectors With Spherically Convex-Polished End", Electron Lett., vol. 22, 1986, p. 110.
Printout: ThorLabs, AR-Coated Patch Cables, Sep. 25, 2012, 2 Pages.
"Vertically Integrated Fiberoptic Devices", 2008 Seminar, The Electro-Optics Assoc., The Photonics Society of Chinese-Americans, Northern California Chapter, 1 Page.
Matsumodo, Craig, "The Lowly Optical Connector Gets a Makeover, Light Reading, 2014" Available at http://www.lightreading.com/optical/optical-components/the-lowly-optical-connector-gets-a-makeover/d/d-id/685655.
Mitsuru Kihara, "Investigation Into Optical Performance of Fiber Connections With Imperfect Physical Contact", Journal of Lightwave Tech., Mar. 15, 2013, V. 31, No. 6, p. 967-974, IEEE.
Benjamin B. Jain, "The Non-Contact Connector: A New Category of Optical Fiber Connector", OFC Conf. and Exhibition, Mar. 22, 2015, p. 1-3, IEEE, Los Angeles.
International Search Report and Written Opinion of corresponding PCT Patent Application No. PCT/CN2020/100916 dated Sep. 28, 2020.

* cited by examiner

MICROFABRICATION METHOD FOR OPTICAL COMPONENTS

CROSS-REFERENCE TO RELATED APPLICATIONS

This application claims priority from U.S. patent application Ser. No. 16/505,673, filed Jul. 8, 2019, the disclosure of which are incorporated by reference herein.

FIELD OF THE INVENTION

The present invention relates to a microfabrication method using a microfabrication mold, material deposition, material removal, etching, and coating to create an optical component such as a multi-fiber optical fiber connector.

BACKGROUND

Multi-fiber optical connectors are widely used by telecommunication system operators for various applications. Multi-fiber connectors are predominantly MPO fiber connectors. Commercially available MPO fiber connectors include fiber counts of, for example, 8, 12, 24, 48, or 72 fibers. For single mode (SM) fiber connectors which has much smaller fiber alignment tolerance than multimode fibers due to its much smaller fiber core, the most common fiber count of SM MPO connectors is 12 fibers today. Higher fiber count SM MPO connectors such as 24 or 48 fibers are also possible, although their optical performance deteriorates seriously compared to 12 fiber SM MPO connectors.

In part, the deteriorating performance with higher fiber counts is because conventional connectors are made with traditional polymer molding techniques; these molding techniques cannot achieve the precise alignment required. For example, physical pins must be positioned accurately in the mold to form the fiber holes and guide holes. However, it is very difficult to use molding to achieve a higher count 2-dimensional (2D) fiber holes accurately.

To satisfy the increasing demand of massive data transfer, components in optical communication systems are being developed to be miniaturized and highly integrated. Particularly, integrating large numbers of SM fibers (such as 144 or 576) on a single fiber connector is a long-felt need. However, great challenges lie in the fabrication of such fiber connectors.

There have been several approaches to make multi-fiber connectors with high-density 2D fiber arrays. In the following, each approach is reviewed.

1) Traditional MPO Multi-Fiber Connector

MPO connectors use MT connector ferrules to align the fibers. The MT connector ferrules for SM fibers typically have one linear array of 12 or 8 fiber holes, and two large guide holes for guide pin alignment.

MT connector ferrules are plastic parts made by plastic molding processes. Because fiber holes and guide holes are formed by molding plastics around physical pins in the mold, when there is a high count 2D array of physical pins, it is very difficult to position these pins accurately and replicate the mold faithfully.

Although a 72-fiber multimode MPO connector in a 2D configuration (12×6) has been introduced by some manufacturers, its geometrical precision of fiber holes and guide holes is far inferior to 12-fiber multimode MPO connectors. In addition, a SM fiber version of this connector is unavailable.

The operating principle of traditional MPO connectors is physical contact. Fibers are polished so that they protrude from the surrounding MT ferrule surface, to ensure uniform physical contact of every fiber surface. Higher fiber count MPO connectors not only have problems with SM fiber alignment tolerance, they also suffer from problems such as poor physical contact and sensitivity to dust and contaminants.

2) MXC Connector

In 2013, MXC connectors with 64 fibers using lenses were announced by Corning, Intel, and US Conec. While the lens-based design allows this connector to operate without physical contact and ensure much more robust connection, insertion loss is high (0.8 dB insertion loss) even for multimode fiber. Furthermore, MXC connectors are not availability for SM fiber.

The fiber ferrules in the MXC connectors are made by molding plastics, so these connectors suffer the same limitations as MPO connector ferrules.

A previous approach to non-contact fiber connectors is described by the inventor of the present application in U.S. patent application Ser. No. 13/725,087, filed Dec. 21, 2012, the disclosure of which is incorporated by reference herein.

Thus, there is a need in the art for improved manufacturing techniques for forming high-precision multi-fiber optical fiber connectors, especially for SM fibers. Such high precision multi-fiber optical fiber connectors could be used to terminate the large number of optical fibers needed in modern data centers and telecommunication systems.

SUMMARY OF THE INVENTION

The present invention provides a microfabrication method for manufacturing a high-density, recessed-fiber, multi-fiber optical connector ferrule, capable of providing sub-micron fiber alignment precision suitable for SM optical fibers. The method includes microfabricating a ferrule mold having a reverse-image of a through-hole array for optical fibers and guide holes. The through-hole array has at least four through-holes, including two guide holes and two fiber holes. Each guide hole is dimensioned and configured to hold and align a guide pin. Each fiber hole is dimensioned and configured to hold and align an optical fiber. Guide holes facilitate passive alignment between mating optical connectors.

A non-polymeric ferrule material is deposited in said ferrule mold, followed by removing the ferrule mold to create a non-polymeric multi-fiber connector ferrule.

An optical fiber is inserted to extend through each of the fiber holes and affixed by a suitable adhesive. Each optical fiber is polished to form an endface, which is approximately level with the top surface of the multi-fiber connector ferrule but is slightly recessed from said top surface by a distance of at least approximately 0.1 micron. The recess may be formed by differential polishing of the non-polymeric ferrule and fiber endfaces. Alternatively, a layer of spacer material may be deposited over said top surface of the multi-fiber connector ferrule.

An antireflection coating is deposited such that it covers said top surface of the multi-fiber connector ferrule and the endfaces of the recessed fibers.

DETAILED DESCRIPTION

Figure 1A:
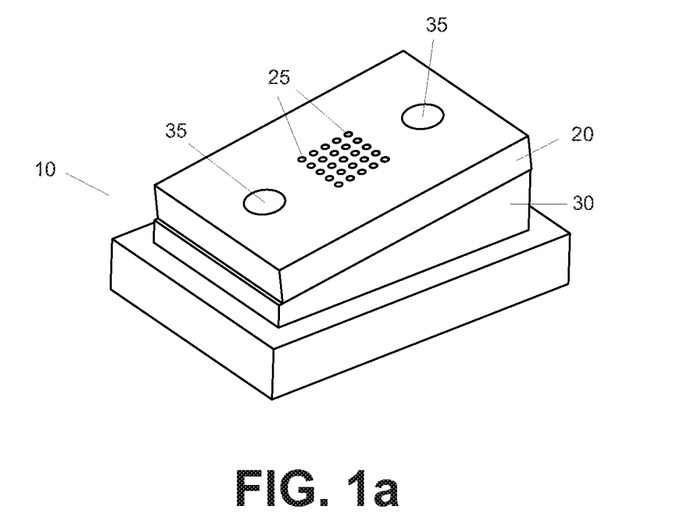
FIG. 1a and FIG. 1b depict perspective and cross-sectional views of a multi-fiber optical connector ferrule 10 made by the method of the present invention.
Figure 1B:
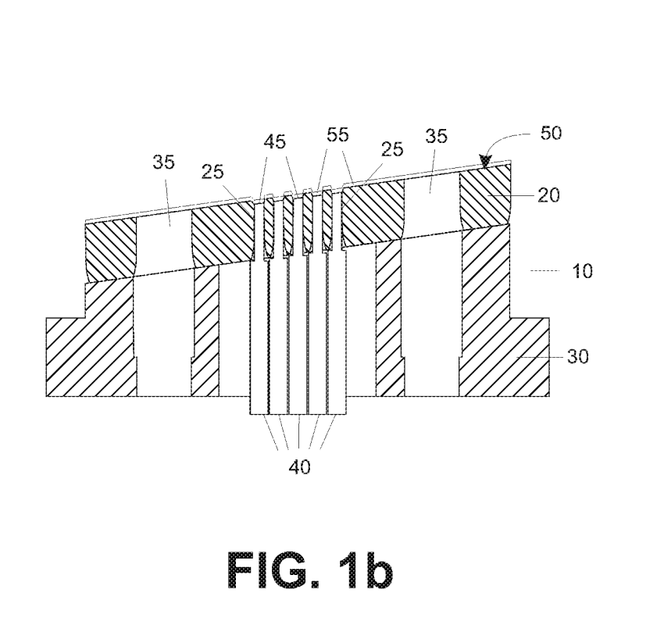

Turning to the drawings in detail, FIGS. 1a-1b depict perspective and cross-sectional views of a non-contact multi-fiber connector ferrule 10 formed by the method of the present invention.

The non-contact multi-fiber connector ferrule 10 includes a ferrule chip 20 and a ferrule pedestal 30. The ferrule chip 20 is significant because it provides the very high precision of this non-contact multi-fiber connector ferrule 10.

The ferrule chip 20 has at least four through holes, including two guide holes 35 and two fiber holes 25. Each guide hole 35 is dimensioned and configured to hold and align a guide pin. Each fiber hole 25 is dimensioned and configured to hold and align an optical fiber. Guide holes 35 facilitate passive alignment between mating multi-fiber optical fiber connectors.

While twenty-five fiber holes (5×5 array) are depicted for clarity of presentation, it is understood that substantially larger numbers of fiber holes may be formed in the multi-fiber optical connectors of the present invention. For example, a 2D array of 12×12 fiber holes or 24×24 fiber holes may also be formed in the multi-fiber optical connectors. Those of ordinary skill in the optical connector art will appreciate that an arbitrary number of fiber holes in arbitrary configurations may be formed using the disclosed techniques.

Inserted in each fiber hole 25 is an optical fiber 40 which may be a single mode (SM) or multimode optical fiber. The precise microfabrication techniques used to make the ferrule chip create a connector where the fiber alignment precision is sufficient for the smaller core of the SM optical fibers. As seen in FIG. 1b each fiber endface 45 is recessed from a ferrule contact surface 50 of ferrule chip 20. An antireflection (AR) coating 55 is deposited over each fiber endface 45 and on the ferrule contact surface 50. Guide holes 35 are optionally included to facilitate passive alignment between mating optical connectors.

To manufacture the ferrule chip 20, a ferrule mold is microfabricated having "chimney-like" pillars for the fiber holes and guide holes, as depicted in the example microfabrication process of FIGS. 2a-2l, including the steps of mask preparation, photolithography, dry etching, metal electroplating and demolding.

In the example of FIGS. 2a-2l, the central axis of the fiber hole is slightly tilted with respect to the surface normal of the ferrule chip. In this exemplary embodiment, the tilt angle is selected to be 6 degrees. The tilt angle is selected to minimize return loss for the optical fiber connections. However, it is understood that the microfabrication process depicted in FIGS. 2a-2l may also be used to form other angles or multi-fiber optical connectors with no angle.

The microfabrication process of FIGS. 2a-2l are performed using silicon as the mold material to form the ferrule chip 20. However, other materials may be used to form the mold material such as photoresist and other polymeric materials. Other semiconductor materials such as germanium may also be used. Metals may also be used. In short, any material that is susceptible to microfabrication techniques and can be formed with submicron accuracy may be used as the mold material to form ferrule chip 20.

Wafer Bonding

Figure 2A:
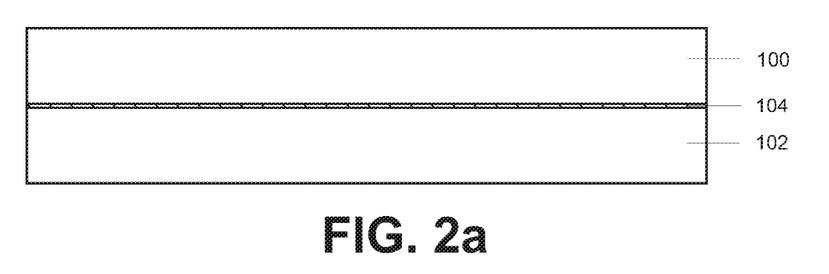
FIG. 2a shows a silicon wafer bonded to a support wafer.

Referring to FIG. 2a, there is a silicon wafer 100 that serves as the substrate for microfabrication, and another silicon wafer 102 that serves as an optional support substrate. The two wafers 100 and 102 are bonded together and there is a metal layer 104 between the two silicon wafers for the subsequent electroplating step. The metal layer 104 is preferably a thick layer of metal such as tin, aluminum, gold, or alloys thereof.

Photoresist Coating

Figure 2B:
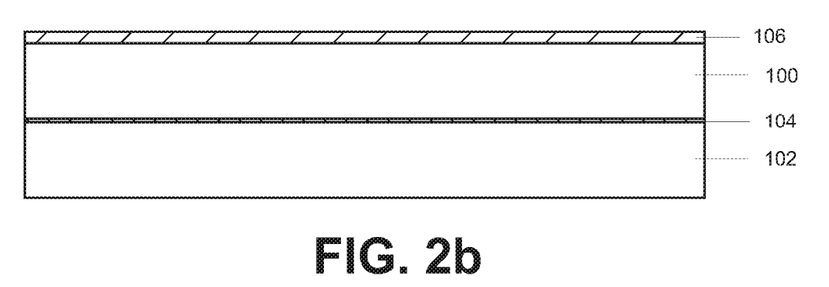
FIG. 2b shows the silicon wafer structure of FIG. 2a with a photoresist layer coated on its top surface.

In FIG. 2b, the silicon wafer 100 is shown coated with a photoresist layer 106 on its top surface. The photoresist may be either organic or inorganic, positive or negative depending on the selected mask design. It may be applied by any appropriate techniques, including but not limited to dipping, spraying, spinning or vapor deposition. In an exemplary embodiment, a spin-coated 5740 Novolak photoresist with a 2 micron thick layer is used as layer 106.

Photomask

Figure 2C:
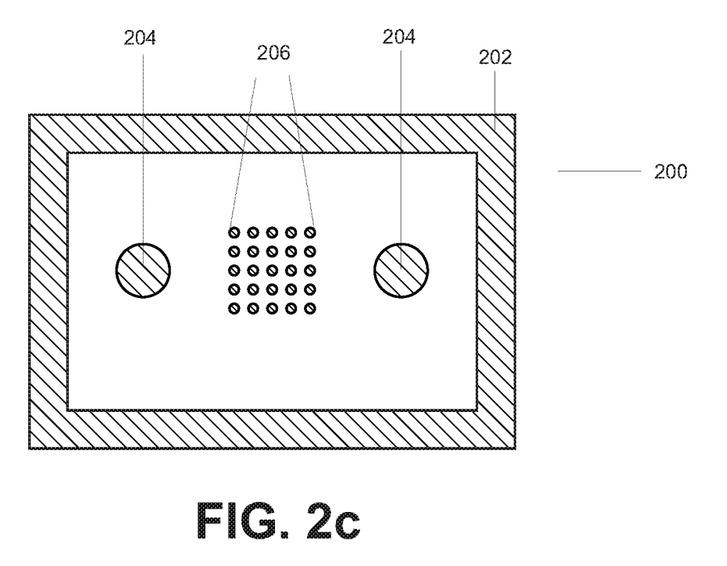
FIG. 2c shows a photomask which contains guide holes, fiber holes and optional ferrule chip wall.

A photolithographic mask 200 is used for microfabrication. Referring to FIG. 2c, the photomask includes designed patterns of guide holes 204, an array of fiber holes 206 and optionally ferrule chip wall 202. Fiber holes and guide holes can take other forms than round hole.

Mask 200 assumes a positive photoresist, so that exposed photoresist is removed in a subsequent development step.

UV Exposure

Figure 2D:
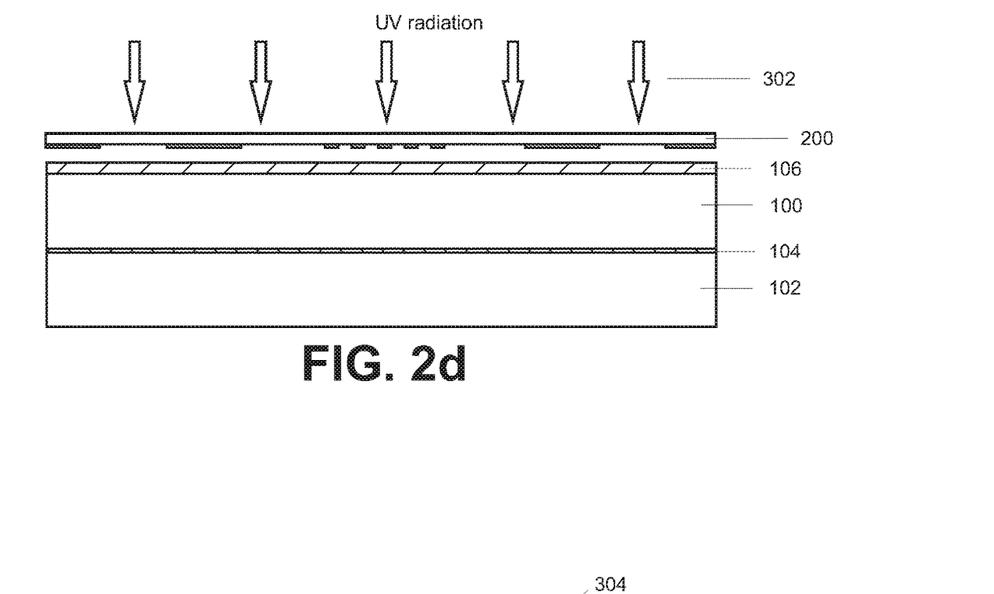
FIG. 2d shows photolithography performed with the photomask of FIG. 2c.

As shown in FIG. 2d, photolithography is performed with the photomask 200. UV radiation 302 (or other selected radiation, including x-rays, laser radiation, etc., depending upon the selected photoresist) replicates the photomask pattern on the photoresist 106.

Photoresist Development

Figure 2E:
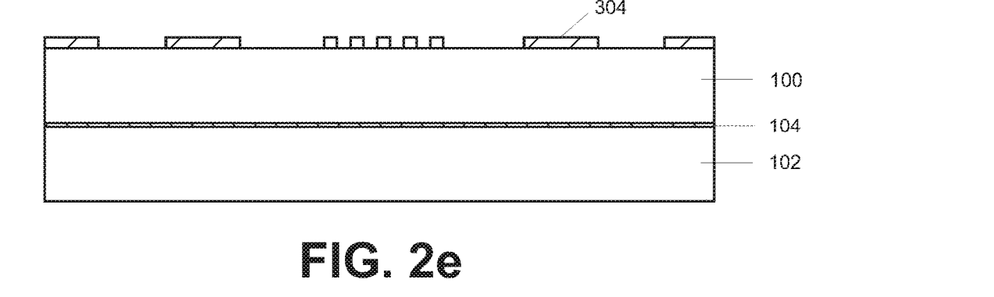
FIG. 2e shows the structure of FIG. 2b after the photoresist development step.

After photoresist development (involving removal of the exposed photoresist), the pattern shown in FIG. 2e is formed. Areas intended to be guide holes and fiber holes are protected by photoresist 304, which serves as an etch barrier during subsequent processing.

Dry Etching

Figure 2F:
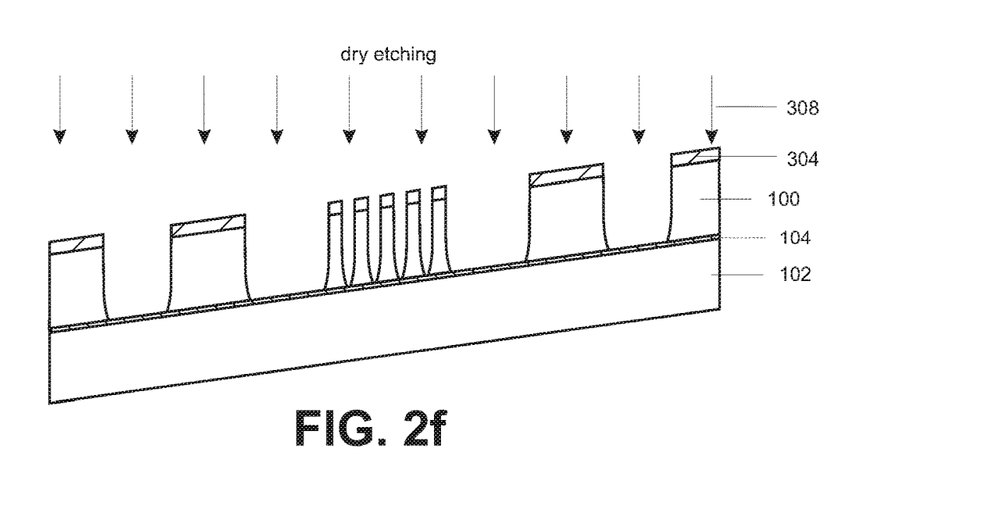
FIG. 2f shows the structure of FIG. 2e after dry etching step.

The silicon wafer 100 is etched in a dry etching process, as shown in FIG. 2f. In a preferred embodiment, etching should be done using a DRIE (deep reactive ion etching) process or other microfabrication techniques which can provide sub-micron accuracy.

Dry etching plasma 308 will etch through the silicon wafer 100 from the top surface until it reaches an etch stop layer, and metal layer 104 is exposed.

In a preferred embodiment, the wafer should be tilted with a small tilt angle with respect to the dry etching direction. The preferred tilt angle is 6 degree.

Stripping Photoresist

Figure 2G:
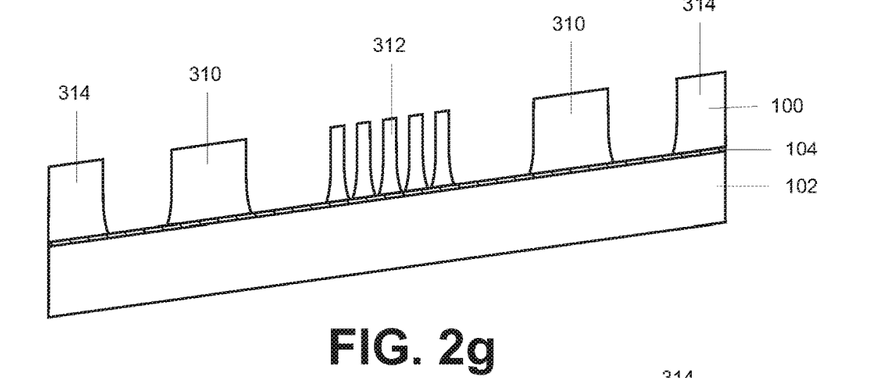
FIG. 2g shows the completed silicon ferrule mold.
Figure 2H:
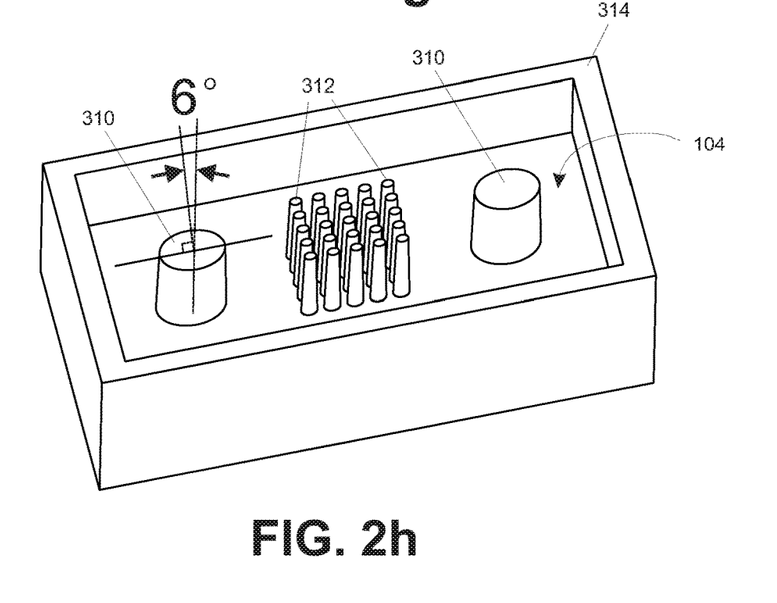
FIG. 2h is a perspective view of the silicon ferrule mold.

After the dry etching step, the remaining photoresist 304 should be stripped, so that a silicon ferrule mold is completed, including pillars for fiber holes 312 and pillars for guide holes 310, and a ferrule chip wall 314, as shown in FIG. 2g (side view). A perspective view of the silicon ferrule mold is shown in FIG. 2h. In the preferred embodiment, the fabricated pillars 312 and 310 should have slightly enlarged bottom.

The structure depicted in FIG. 2g will serve as a mold for the ferrule chip as seen in the subsequent processing steps.

The ferrule mold can be formed using any microfabrication method which can provide sub-micron accuracy, including but not limited to LIGA, UV LIGA, and laser microprocessing. Another preferred method to form the ferrule mold is by using SU-8 photopolymer.

Electroplating

Figure 2I:
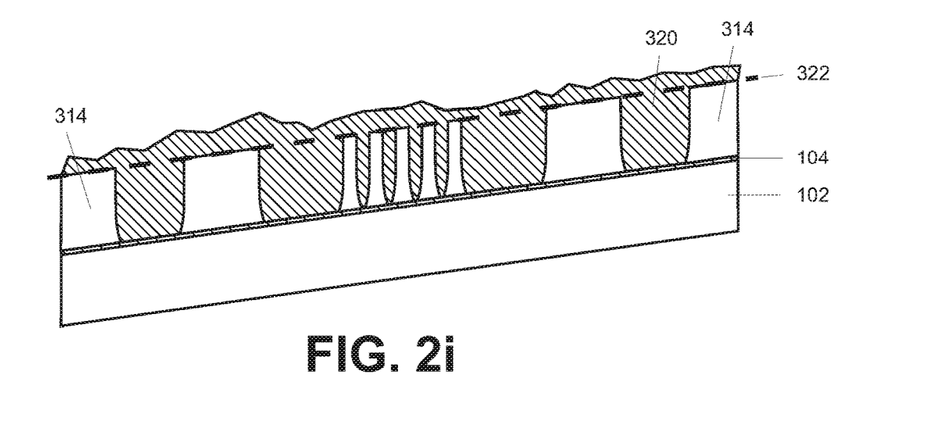
FIG. 2i shows the silicon ferrule mold after the electroplating step is completed.

An electroplating process to form the ferrule chip is conducted by making electrical contact to the metal layer 104 in an electroplating bath, to gradually fill up the empty space of the silicon ferrule mold with metal 320 from the metal layer 104, until it overflows from the top of the silicon pillars. FIG. 2i is a schematic view of the ferrule mold filled with metal to form the ferrule chip after electroplating is completed.

A preferred material for metal 320 may be a nickel alloy. However, other materials having over 50 GPa Young's modulus can be used. The mold filling method is not limited to electroplating. For example, stamping or nanoimprint methods may also be used to create the metal ferrule chip 20.

Other deposition methods may also be selected depending upon the material to be used to form the ferrule. These include vapor deposition (chemical vapor deposition, evaporation, sputtering, ion beam deposition) or molding techniques when ceramic-based materials are selected for the ferrule.

Polishing to Remove Excess Metal

Figure 2J:
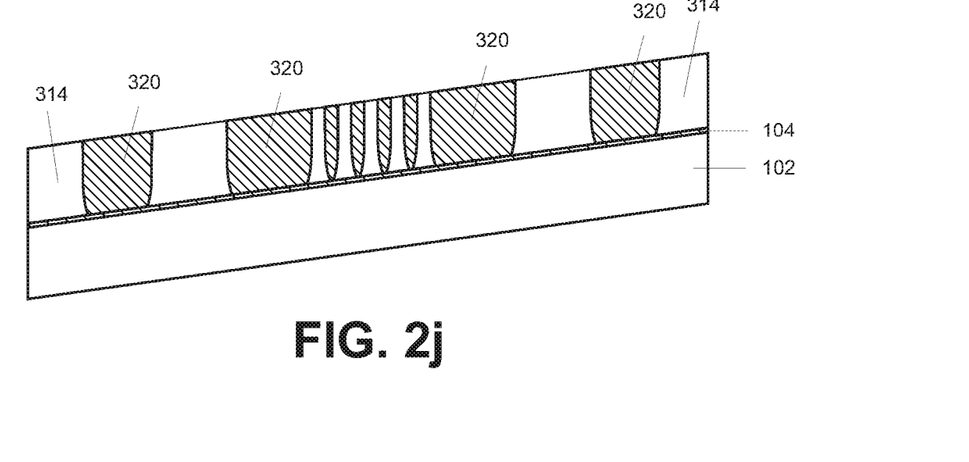
FIG. 2j shows the electroplated silicon ferrule mold after the polishing step is completed.

The electroplated wafer of FIG. 2i is polished along polishing plane 322 to remove the over-deposited metal, ensuring a flat surface of the fabricated ferrule chip. FIG. 2j is a schematic view of the ferrule chip still in the ferrule mold after the polishing step is completed.

Ferrule Mold Release

Figure 2K:
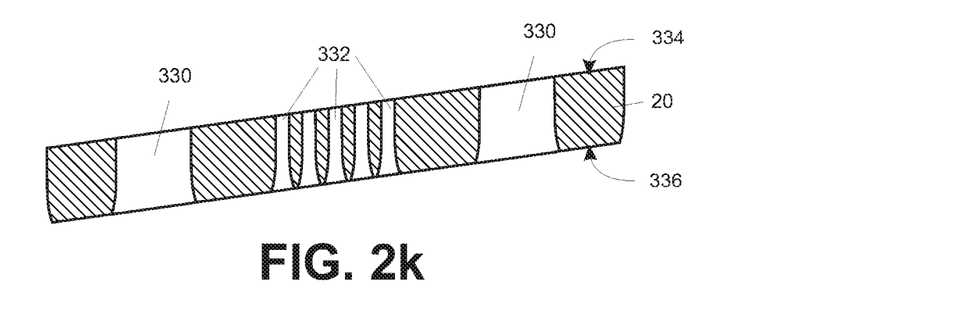
FIG. 2k shows a finished ferrule chip.

Metal ferrule chips 20 are released from the silicon ferrule mold by etching away the silicon wafers by a suitable process, for example wet etching. Mechanical methods of mold release may also be selected. Dicing may be unnecessary because the ferrule chips are separated by ferrule chip wall 314. FIG. 2k is the finished ferrule chip 20.

Ferrule Chip Configuration

Figure 2L:
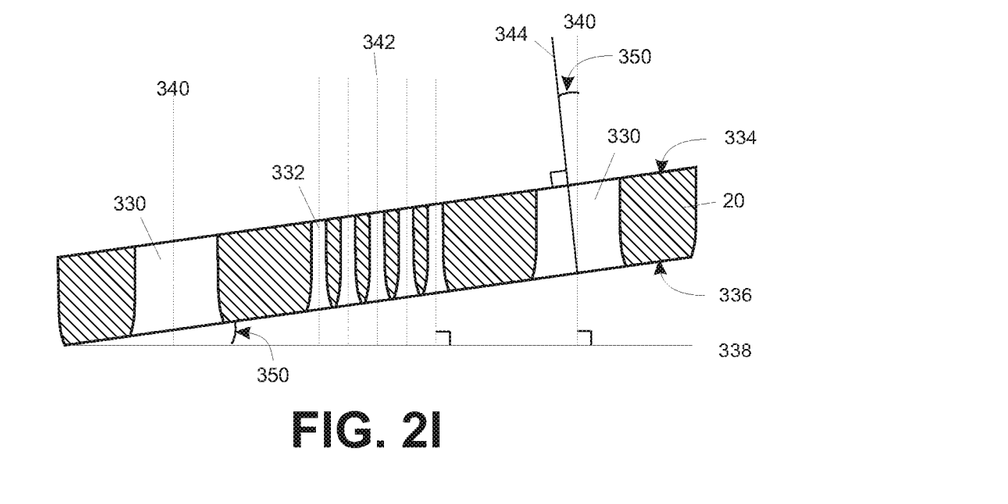
FIG. 2l further depicts the finished ferrule chip.

FIG. 2l is the ferrule chip 20 in further detail. The ferrule chip 20 is a thin layer of metal material. It has two sets of through-holes, including two guide holes 330 and five fiber through-holes 332. Each guide hole 330 is dimensioned and configured to hold and align a guide pin, while each fiber hole 332 is dimensioned and configured to hold and align an optical fiber.

In the preferred embodiment the ferrule chip 20 has a thickness of approximately 700 microns. This thickness provides sufficient structural integrity, while being thin enough to be made economically using a microfabrication process.

While a 25-count array of fiber holes is depicted for clarity of presentation (5 in cross section times five rows deep), it is understood that substantially larger numbers of fiber holes in arbitrary configurations may be formed in the multi-fiber connector ferrule of the present invention. For example, a 2D array of 12×12 fiber holes or 24×24 fiber holes may be made using the method of the present invention.

Tilt Angle

As shown in FIG. 2l, the central axes 340 of guide holes 330 and central axes 342 of fiber holes 332 should be parallel to each other. In one embodiment, there is a small tilt angle 350 between the hole axis 340 and the surface normal 344 of the ferrule chip 20. This tilt angle may help to improve the multi-fiber optical connector's return loss. This tilt angle may be preferably from 5-8 degree, but may be other angles, for example, from 1 degree to 15 degree. As seen in FIG. 2I, the ferrule front surface has a front surface tilt angle 350 with respect to a direction of connection of the multi-fiber optical connector component.

Fiber Hole and Guide Hole Profile

As shown in FIG. 2l, near top surface 334 of the ferrule chip 20, the fiber hole and guide hole diameters are uniform along the central axis 340 and 342 to provide accurate fiber angular alignment, but become wider to facilitate easy fiber insertion from the back side 336 of the ferrule chip 20.

Fiber holes and guide holes are most accurate on top surface 334 of the ferrule chip 20, where guide holes 330 and fiber holes 332 have sub-micron accuracy in their central locations due to the microfabrication process. This accuracy ensures accurate alignment of SM fibers with minimum insertion loss.

Combining Ferrule Chip with Ferrule Pedestal

Figure 3A:
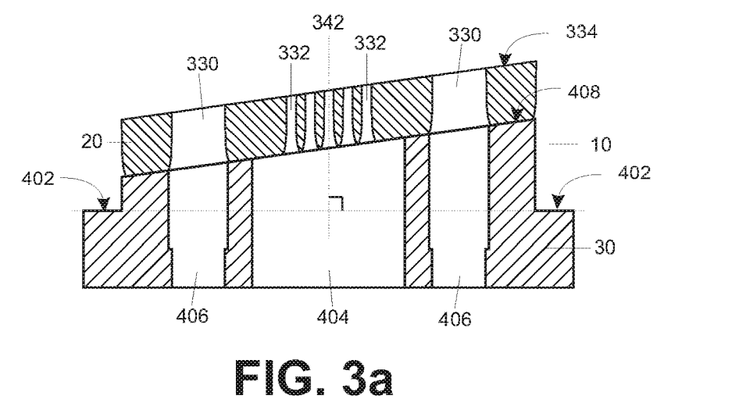
FIG. 3a shows a multi-fiber connector ferrule including a ferrule chip and a ferrule pedestal.

FIG. 3a shows a multi-fiber connector ferrule 10, including a ferrule chip 20 and a ferrule pedestal 30. Because the ferrule chip 20 is a thin layer, the multi-fiber connector ferrule 10 optionally uses additional structure during later processing and in eventual operation inside an optical fiber connector housing. The ferrule chip 20 may be affixed permanently to a ferrule pedestal 30 to form the multi-fiber connector ferrule 10.

The ferrule pedestal 30 may include a flange 402, a fiber cavity 404, two guide pin cavities 406 for fibers and guide pins to pass through, respectively. Fiber cavity 404 is preferably separate from the two guide pin cavities 406. By separating the fiber cavity, epoxy used to affix the fibers does not flow into and block the guide holes 330.

Guide pin cavities 406 may have a slightly larger diameter than the diameter of the guide hole 330 near the ferrule top surface 334, to avoid interference with the operation of the guide holes 330. However, the guide pin cavities 406 may have a narrow part near their bottom portions, to define the angle of the guide pins (two points determine a line).

The ferrule pedestal 30 may have a flange 402 for easy positioning and surface registration. The ferrule pedestal 30 may have a tilted surface 408, and the angle of the tilted surface is the same as tilt angle 350 of the ferrule chip 20 in FIG. 2l, so that fiber hole axis 342 is perpendicular to the flange surface 402. The flange design facilitates a subsequent polishing operation, and when the multi-fiber connector ferrule 10 is assembled into a connector housing, not shown. The ferrule pedestal 30 may be formed from plastics, metal, or any other rigid material.

Fiber Insertion

Figure 3B:
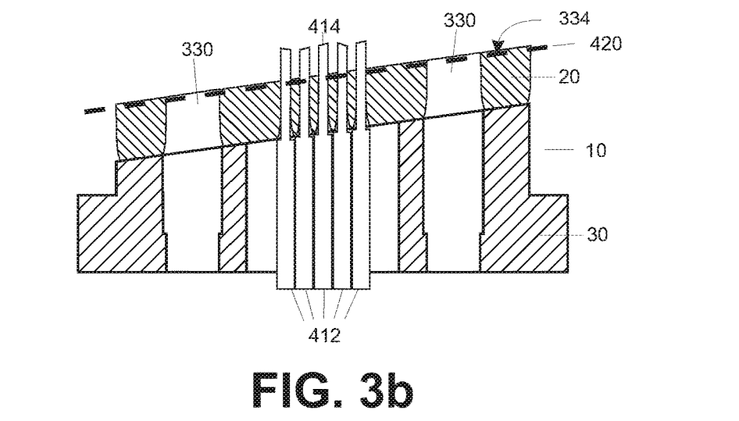
FIG. 3b shows the multi-fiber connector ferrule after fibers are inserted through the fiber through-holes and permanently affixed with epoxy.

FIG. 3b depicts a cross-sectional view of the multi-fiber connector ferrule 10, after fibers 412 are inserted through the fiber holes and permanently affixed with epoxy or other suitable fixing agent. The optical fiber 412 may be a SM or multimode optical fiber. A length of fiber with plastic jacket stripped 414 is shown in FIG. 3b.

Care must be taken to ensure that no epoxy flows into the guide holes 330. Care must be taken to ensure that epoxy does not flow downward along the fibers 412 through a capillary effect and make the fibers 412 too rigid. Otherwise it would require too much force on the guide holes 330 to passively align the connector ferrule 10.

As shown in FIG. 3b, after affixing the fibers with epoxy, the fibers 414 protrude from the ferrule chip surface 334.

The multi-fiber connector ferrule 10 is polished along polishing plane 420, which is parallel to original ferrule chip top surface 334. This ensures that very little ferrule chip material is polished away.

Because fiber holes and guide holes are most accurate on top surface 334 of the ferrule chip 20, and plane 420 is very close to plane 334, fiber holes and guide holes are very accurate on plane 420 as well.

Recessed Fiber Endfaces

Figure 3C:
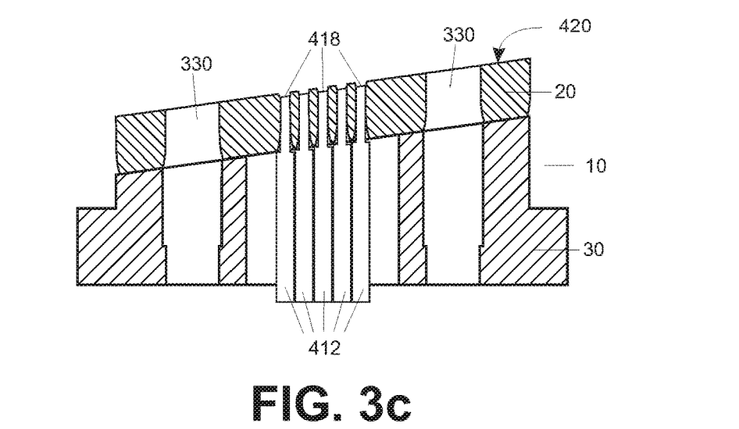
FIG. 3c shows the multi-fiber connector ferrule after the polishing step, showing recessed fiber endfaces.

The multi-fiber connector ferrule 10 should have fiber endfaces 418 slightly recessed from the new ferrule chip top surface 420, as shown in FIG. 3c. As seen in FIG. 3c adjacent optical fiber endfaces 418 are positioned at different elevations relative to each other with respect to a direction of connection of the ferrule.

To achieve the recessed fiber endfaces 418, one embodiment uses a differential polishing process. This differential polishing process uses cerium oxide as the final polishing particle. During differential polishing, the glass material of the optical fiber is removed at a greater rate than the nickel alloy material of ferrule chip 20. Therefore, the fiber endfaces 418 are recessed with respect to the surrounding ferrule chip top surface 420.

Fiber endfaces 418 are prevented from making contact with opposing fiber endfaces in a mating connector by the recessed fiber endfaces. For SM fiber, a recess of approximately 0.5-1.0 micron is sufficient to prevent fiber endfaces 418 from making contact with mating fiber endfaces.

Recessed fiber depth can be made larger (3-5 microns for example) so that any large contaminants such as dust would be contained in the recess without affecting fiber endfaces 418. This larger recess makes the multi-fiber connector more tolerant of dusty and contaminated environments. Recessed fiber depth from 0.1 micron to 10 microns may be selected.

An alternative method to achieve recessed fiber endface 418 is to deposit a thin layer of spacer material on the top surface 420 of the ferrule chip 20. One preferred embodiment may be additional electroplating after fibers are polished, to plate a thin layer of metal such as nickel on the metal surface of the ferrule chip 420, causing the fiber endfaces 418 to be recessed from the surrounding ferrule chip surface. Because the silica fiber is non-conducting, electroplated nickel will not cover the fiber endfaces 418 and therefore a spacer is formed.

AR Coating

Figure 3D:
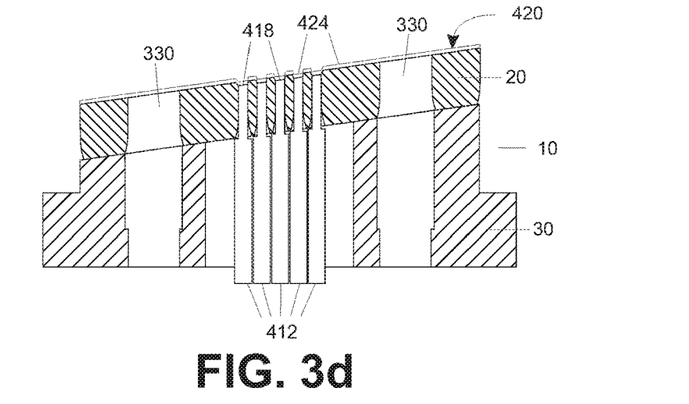
FIG. 3d shows the multi-fiber connector ferrule 10 after the antireflection coating.

In order to eliminate the multiple reflections between two fiber endfaces with an air gap in between, an antireflection (AR) coating layer 424 is coated over the fiber endfaces 418 as shown in FIG. 3d. Typically the top surface 420 of the ferrule chip 20 is also coated. The AR coating layer 424 is intended to cover the entire surface, except guide holes 330 which are protected by a suitable deposition mask.

The AR coating band is selected according to the operating wavelength range of the optical system in which the connector is to be used. An AR coating with residual reflectivity of less than 0.2% may be selected. The thickness of the AR coating is typically on the order of 1 micron. This thickness is sufficient to achieve the desired antireflection properties.

Male Ferrule Chip

Figure 3E:
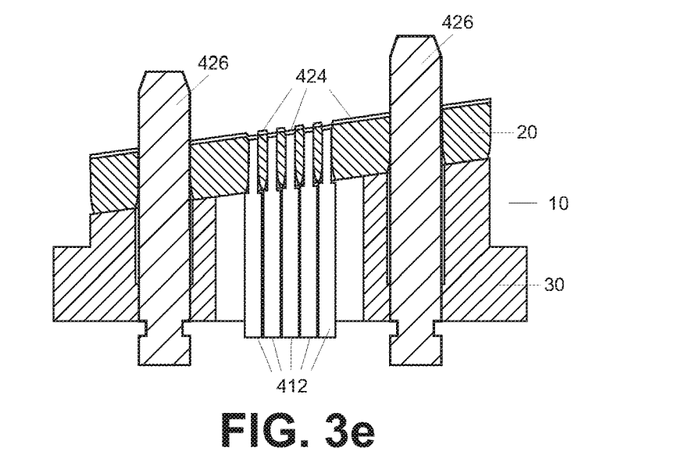
FIG. 3e shows a male multi-fiber connector ferrule with guide pins in place.
Figure 3F:
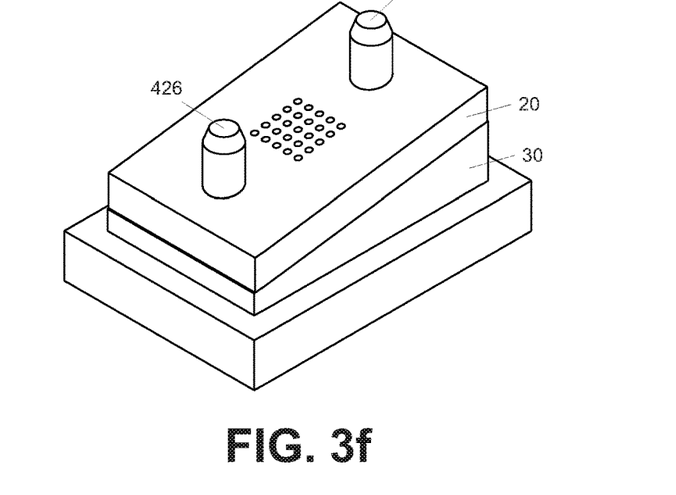
FIG. 3f is a perspective view of the male multi-fiber connector ferrule.

FIG. 3e shows a cross-sectional view of the multi-fiber connector ferrule 10 with guide pins 426 in place to create a "male ferrule". A perspective view of the same part is shown in FIG. 3f. Guide pins 426 typically have a chamfered tip which facilitates insertion into the guide holes. Guide pins 426 may be made of stainless steel with a precise diameter and smooth surface. However, other rigid materials such as ceramics may also be used to make the guide pins 426.

Two Ferrules Mated Together

Figure 3G:
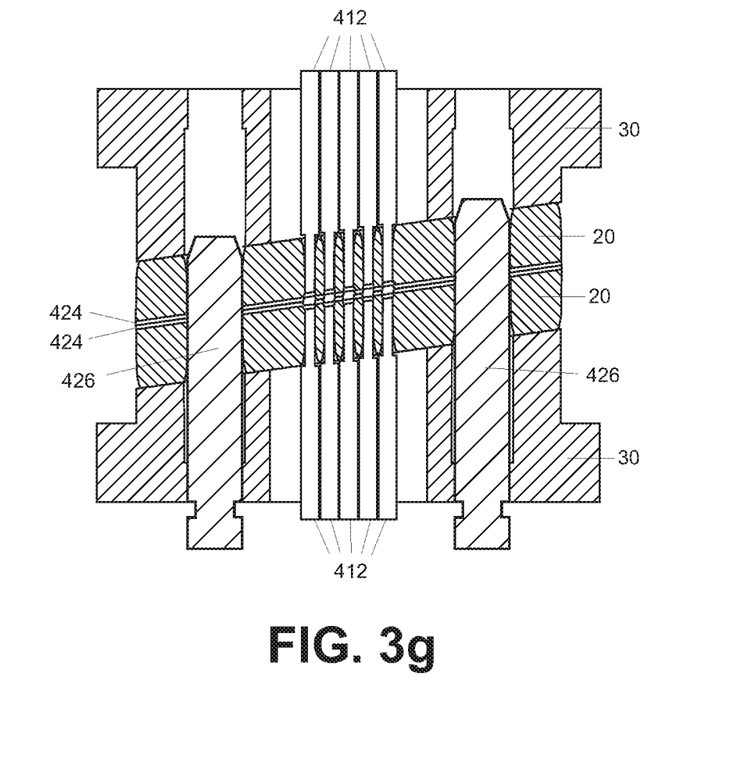
FIG. 3g shows the female and male multi-fiber connector ferrules mated together.

FIG. 3g depicts a cross-sectional view of female and male multi-fiber connector ferrules mated together. The AR coating layers 424 of the two opposing connector ferrules contact each other.

Guide pins 426 are positioned by the guide holes to align the top connector ferrule to the bottom connector ferrule, thereby achieving precise sub-micron alignment of each of the fibers 412 with mating fibers of the opposing connector ferrule. The presence of fiber recess will prevent the fiber endfaces from making contact. The AR coating 424 on the surface of the ferrule chip 20 will make contact during the operation of the connector, but because the connector ferrule surface is flat and large, the force is distributed over a larger area, preventing flaking or chipping of AR coating 424.

Optional Tilt Angle

The reasons for the optionally tilted fiber holes and guide holes are the following. It is well known that fiber connector endfaces are often polished at an angle (for example 8 degree) in order to have a high return loss value, for example, above 60 dB. If fiber holes and guide holes are formed in a new ferrule chip 440 with a tilt angle of zero degree, as illustrated in FIGS. 4a and 4b, then the new ferrule chip 440 may optionally be polished with a tilt angle of 8 degree, for example.

Figure 4A:
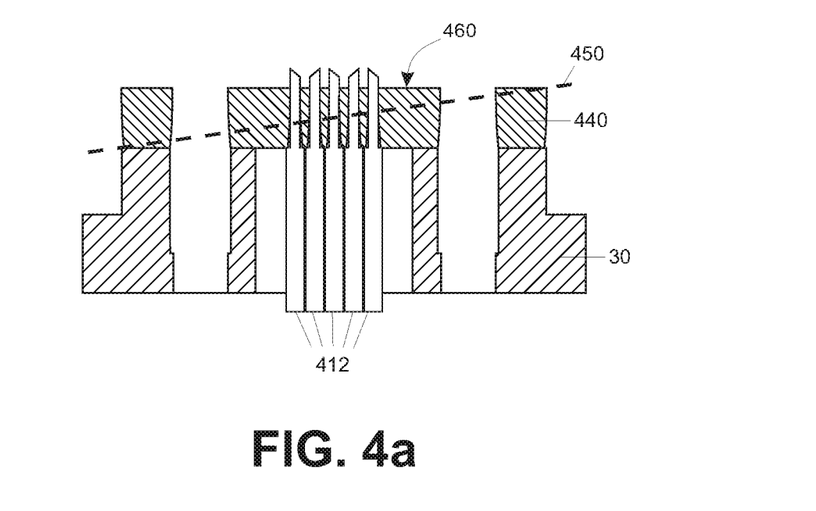
FIG. 4a shows a multi-fiber connector ferrule with no tilt angle, with fibers inserted.

FIG. 4a shows the new ferrule chip 440 with fibers 412 inserted and affixed with epoxy. Polishing plane 450 is shown. Fiber holes and guide holes are most accurate on the top surface 460 of the ferrule chip 440.

Figure 4B:
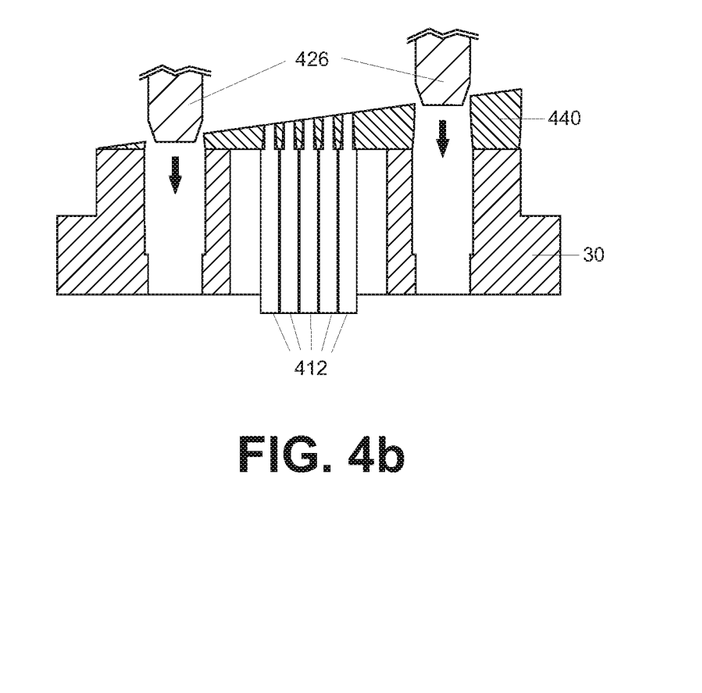
FIG. 4b shows the female multi-fiber connector ferrule after the polishing step, ready to receive guide pins.

FIG. 4b shows the female multi-fiber connector ferrule after the polishing step, ready to receive guide pins 426. The arrows in FIG. 4b show the direction of connection of the multi-fiber connector ferrule. Two consequences can be seen:

An 8-degree polishing step could polish away one side of the ferrule chip 440 completely, because the ferrule chip is only about 0.7 mm thick in the preferred embodiment.

After a polishing step, guide hole openings may not be accurate enough to align guide pins 426, because the most accurate part of the guide holes on the top surface 460 of FIG. 4*a* may be polished away, resulting in enlarged guide hole openings. Likewise, fiber endface positions may not be sufficiently accurate.

The major benefit of the tilt angle is that grinding away of significant ferrule chip material is avoided. Referring to FIG. 3*c*, all fiber hole openings and guide hole openings have the same shape after a polishing step. Fiber holes and guide holes are the most accurate, because they are polished very little.

In a preferred embodiment for high return loss, the tilt angle is chosen to be 6 degree or 8 degree, but it can be any angle from 1 degree to 15 degree. If high return loss is not a concern, a tilt angle of zero degree may also be selected.

Optical Performance of the Multi-Fiber Connector

Because the multi-fiber connectors disclosed here are formed by photolithographic processes, the center positions of the guide holes and fiber holes have tolerances of about 0.1 micron, and the diameters of the guide holes and fiber holes can be controlled to have a variation of less than 1 micron.

In terms of optical performance, SM multi-fiber connectors made with the method disclosed herein can have insertion loss range from 0 to 0.3 dB, and return loss from 55 to 80 dB. This is approximately the same insertion loss as a SM optical fiber connector (LC, SC, FC etc.,) and thus is acceptable in the "loss budget" of an optical system. The fabrication techniques are reproduceable and scalable to mass-production of multi-fiber connectors.

Metal ferrules made of materials such as nickel have many advantages compared to molded plastic MT ferrules.

A metal connector ferrule has much greater hardness, much lower coefficient of thermal expansion (CTE), much better thermal stability, can withstand a much higher processing temperature, will outgas much less in a vacuum environment such as an AR coating chamber, has much better resistance to guide pin abrasion and much longer mating lifetime, and has smaller electromagnetic interference due to the conductive metal material.

Photomask Pattern Elongation Due to Tilt Angle

Referring to FIG. 2*l*, because the tilted fiber holes and guide holes are sized to receive round fibers and round guide pins, the cross section of fiber holes and guide holes must be round on a plane perpendicular to the fiber axis. A 2D array of round fiber hole patterns with equal pitch in the two directions on plane 338 will become a 2D array of elliptical fiber hole patterns with an unequal pitch when projected on the ferrule chip surface 334, the latter of which are the patterns that the photomask must be designed with. The length of the photomask patterns is "stretched" in one direction with a scaling factor of $1/\cos(\theta)$.

Preferably, the tilt angle $\theta$ should be in one direction of the 2D fiber hole array, although this is not necessary.

If the tilt angle $\theta$ is 6 degree, the scaling factor is 1.01. This is a small correction; however, it ensures sub-micron alignment of fibers in the fiber holes. For example, a round hole of 126 micron diameter on plane 334 will become an elliptical hole of sizes 126 micron and 124.7 micron on plane 338, with the smaller number being too small for a 125 micron diameter fiber.

In order to form a 2D array of fiber holes of 126 micron diameter with 250 micron pitch with a tilt angle of 6 degree, a photomask may be designed to have a 2D array of elliptical holes of sizes 126 micron and 127.26 micron with a pitch of 250 micron and 252.5 micron in the two orthogonal directions.

Dust Channel in the Guide Hole

Because the manufacturing method disclosed herein uses microfabrication, arbitrarily-shaped guide holes may be formed. Various modifications to the guide hole may be made.

In conventional MPO connectors, guide holes are made by molding plastics around a cylindrical object; therefore, it is nearly impossible to have any other shape for the guide holes than round guide holes. Dust or contaminants tend to build up and clog the micron-sized gap between the round guide pin and round guide hole.

Figure 5:
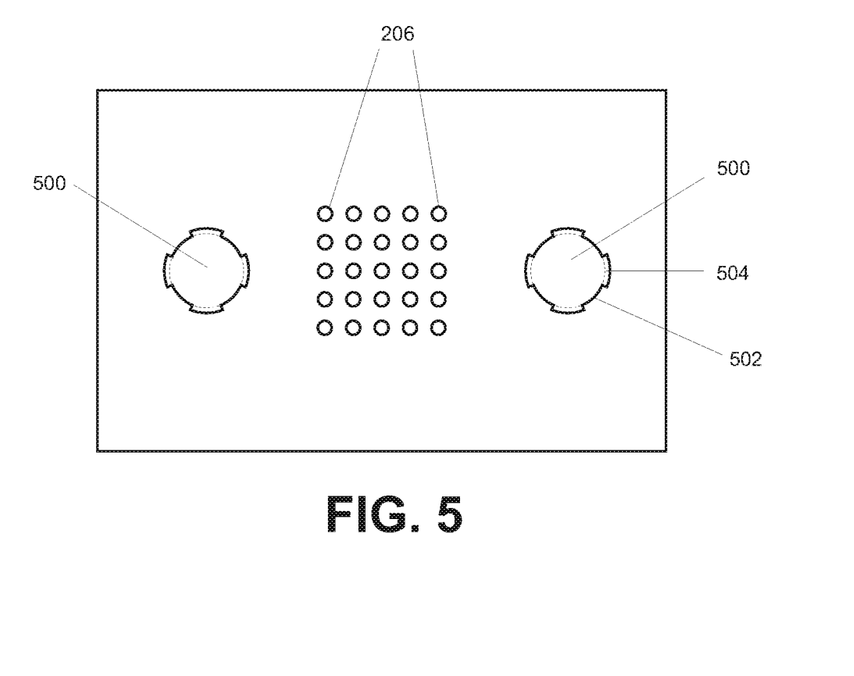
FIG. 5 shows top view of a ferrule chip with modified guide holes with dust channels.

FIG. 5 shows top view of a ferrule chip with modified guide holes 500, which has original unmodified sidewall parts 502 which contact the round guide pin, and modified sidewall parts with "dust channels" 504 which do not contact the round guide pin. The guide hole's dust channels 504 run vertically along the side walls. Alignment of the guide pin is provided by the unmodified sidewall 502. With this structure, small amount of dust or contamination on the guide pins is pushed into the dust channels of the guide holes during connector mating. Therefore, enhanced dust tolerance of this connector is achieved without reducing the alignment accuracy of the multi-fiber connector ferrule and without sacrificing any optical performance.

Spring-Loaded Guide Hole

Figure 6:
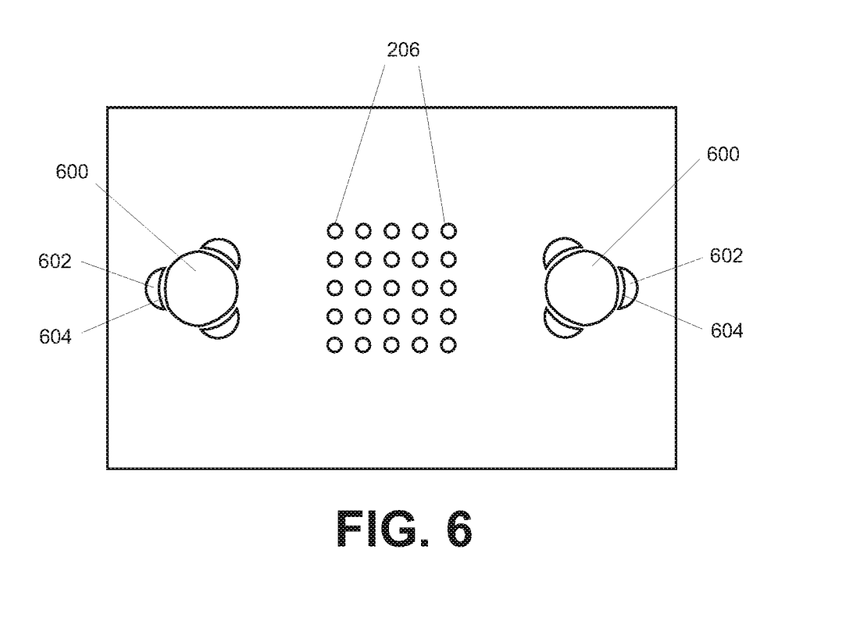
FIG. 6 shows top view of a ferrule chip with modified guide holes which have spring-loaded sidewalls.

FIG. 6 shows top view of a ferrule chip with modified guide holes 600 which has spring-loaded sidewalls. By forming hollow channels 602, part of the sidewall 604 of the guide hole has a thin, deformable wall. The deformable wall acts as a spring-like structure in deforming and resuming its original shape and thus can act as a spring-loaded guide hole.

There are two benefits to a spring-loaded guide hole 600. First, guide pins slightly larger than the undeformed guide hole diameter can be inserted when the spring-loaded wall structure deforms, leaving zero gap between the guide pin and guide hole, and a more precise self-centered alignment. Second, due to the adjustable nature of the spring-loaded guide hole, the guide pin does not need to have the same diameter tolerance that a fixed guide hole would require. The cost of the guide pins is reduced as a result.

It is important to ensure the hollow channels 602 are not filled with debris. Otherwise the spring-loaded guide hole 600 may be affected.

Elongated Female Guide Hole

Referring to FIG. 3*g*, the distance between the two guide holes has a tolerance of less than 1 micron. However, at the tips of the guide pins of the multi-fiber connector ferrule, the distance between the two guide pins is frequently not exactly the same as that of the guide hole distance, due to the guide pins being not parallel to each other, or due to slight bending of the guide pins. When the two guide pins first enter the two female guide holes, this mismatch will cause excessive abrasion of the guide pins and guide holes. The entrance of the guide holes tends to be eroded quickly, resulting in the loss of precision of guide hole alignment, and the reduction of the mating life of the multi-fiber connector.

Figure 7:
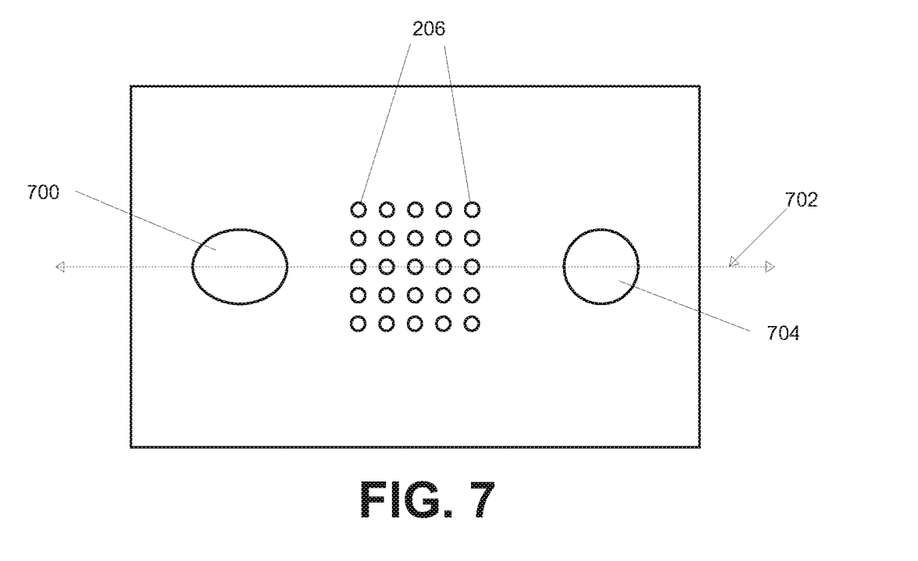
FIG. 7 shows top view of a female ferrule chip with modified guide holes, where one guide hole is round while another guide hole has an elongated profile.

To greatly reduce the above mismatch problem, FIG. 7 shows top view of a female ferrule chip with modified guide holes, where one guide hole 704 is round while another guide hole 700 has an elongated profile in the direction 702.

The round guide hole 704 serves as a position-defining hole, and the elongated guide hole 700 serves as a rotation-limiting hole.

This ferrule chip is useful as a female ferrule chip. A male ferrule chip should still have two round guide holes.

This design provides relief for the mismatch mentioned above, without reducing the alignment accuracy of the multi-fiber connector pair. The guide pins of the male multi-fiber connector ferrule can be inserted into the guide holes of the female multi-fiber connector ferrule even at a slight angle.

This design would have been very difficult to implement using plastic molding processes by which traditional MT ferrules are made. However, because of the microfabrication process disclosed here, arbitrary shaped guide holes can be formed at will, with great positional accuracy.

It will be appreciated by those skilled in the art, in view of these teachings, that alternative embodiments may be implemented without deviating from the spirit or scope of the invention, as set forth in the appended claims. This invention is to be limited only by the following claims, which include all such embodiments and modifications when viewed in conjunction with the above specification and accompanying drawings.

The invention claimed is:

1. A high-density, recessed-fiber, multi-fiber optical connector component made by a microfabrication method, comprising: a non-polymeric optical connector ferrule having a front surface, the optical connector ferrule made from a ferrule mold having a reverse-image through-hole array for optical fibers, said through-hole array including at least two through-holes, each through-hole dimensioned and configured for holding and aligning a single optical fiber; an optical fiber with a fiber endface, positioned in each of said fiber through-holes; an antireflection coating deposited over said the optical fiber endfaces; a fiber recess formed for each of the optical fibers by 1) differential polishing of said non-polymeric ferrule front surface and the endface of the optical fibers, or 2) depositing a layer of spacer material over a portion of the non-polymeric ferrule front surface; wherein a contact surface of the optical connector is separated from the antireflection coating on the fiber endfaces by a distance of at least 0.1 micron; wherein said through-holes are formed at a through-hole tilt angle with respect to the surface normal of said front surface of said non-polymeric optical connector ferrule; and wherein the ferrule front surface has a front surface tilt angle with respect to a direction of connection of the multi-fiber optical connector component such that adjacent optical fiber endfaces are positioned at different elevations relative to each other with respect to the direction of connection.

2. The high-density, recessed-fiber, multi-fiber optical connector component as recited in claim 1, wherein the ferrule mold material is a silicon-based material.

3. The recessed-fiber, multi-fiber optical connector component as recited in claim 1, wherein said non-polymeric optical connector ferrule material is a metal.

4. The high-density, recessed-fiber, multi-fiber optical connector component as recited in claim 3, wherein said metal ferrule material is deposited by an electrodeposition technique.

5. The high-density, recessed-fiber, multi-fiber optical connector component as recited in claim 1, wherein through-holes patterns in two orthogonal directions have two scaling factors, the two scaling factors being related to each other by the cosine of said tilt angle.

6. The high-density, recessed-fiber, multi-fiber optical connector component as recited in claim 1, wherein said optical fibers are single mode optical fibers.

7. The high-density, recessed-fiber, multi-fiber optical connector component as recited in claim 1, further comprising one or more guide pin through-holes or guide pins formed in said non-polymeric optical connector ferrule.

8. The high-density, recessed-fiber, multi-fiber optical connector component as recited in claim 1, further comprising a pedestal connected to said non-polymeric optical connector ferrule.

9. The high-density, recessed-fiber, multi-fiber optical connector component as recited in claim 8, wherein said guide pin through-holes include one or more channels for accommodating dust or other contamination.

10. The high-density, recessed-fiber, multi-fiber optical connector component as recited in claim 8, wherein said guide pin through-hole wall is a deformable spring-like structure.

11. The high-density, recessed-fiber, multi-fiber optical connector component as recited in claim 1, wherein said fiber through-holes have a funnel-shaped expansion at a side opposite from said front surface of non-polymeric connector ferrule.

12. The high-density, recessed-fiber, multi-fiber optical connector component as recited in claim 8, wherein at least one guide pin through-hole has an elongated, elliptical cross-sectional profile.

13. A high-density, recessed-fiber, multi-fiber optical connector component comprising: a non-polymeric optical connector ferrule having a front surface and a through-hole array for optical fibers, the through-hole array including at least two through-holes, each through-hole dimensioned and configured for holding and aligning a single optical fiber; an optical fiber with a fiber endface, positioned in each of said fiber through-holes; an antireflection coating deposited over said fiber endfaces; a fiber recess formed for each of the optical fibers by 1) differential polishing of said non-polymeric ferrule front surface and an end of the optical fibers, or 2) depositing a layer of spacer material over said non-polymeric ferrule front surface, wherein a contact surface of the optical connector is separated from the antireflection-coated fiber endfaces by a distance of at least 0.1 micron; wherein said fiber through-holes are formed at a fiber through-hole tilt angle with respect to the surface normal of said front surface of said non-polymeric optical connector ferrule; and wherein the ferrule front surface has a front surface tilt angle with respect to a direction of connection of the multi-fiber optical connector component such that adjacent optical fiber endfaces are positioned at different elevations relative to each other with respect to the direction of connection.

14. The recessed-fiber, multi-fiber optical connector component as recited in claim 13, wherein said non-polymeric connector ferrule material is a metal.

15. The high-density, recessed-fiber, multi-fiber optical connector component as recited in claim 14, wherein said metal ferrule material is deposited by an electrodeposition technique.

16. The high-density, recessed-fiber, multi-fiber optical connector component as recited in claim 14, wherein through-holes patterns in two orthogonal directions have two scaling factors, the two scaling factors being related to each other by the cosine of said tilt angle.

17. The high-density, recessed-fiber, multi-fiber optical connector component as recited in claim 13, wherein said optical fibers are single mode optical fibers.

18. The high-density, recessed-fiber, multi-fiber optical connector component as recited in claim 13, further comprising guide pin through-holes or guide pins formed in said non-polymeric optical connector ferrule.

19. The high-density, recessed-fiber, multi-fiber optical connector component as recited in claim 13, further comprising a pedestal connected to said non-polymeric optical connector ferrule.

20. The high-density, recessed-fiber, multi-fiber optical connector component as recited in claim 18, wherein said guide pin through-holes include one or more channels for accommodating dust or other contamination.

21. The high-density, recessed-fiber, multi-fiber optical connector component as recited in claim 18, wherein said guide pin through-hole incudes a wall having a deformable spring-like structure.

22. The high-density, recessed-fiber, multi-fiber optical connector component as recited in claim 13, wherein said fiber through-holes have a funnel-shaped expansion at a side opposite from said front surface of non-polymeric connector ferrule.

23. The high-density, recessed-fiber, multi-fiber optical connector component as recited in claim 18, wherein at least one said guide pin through-hole has an elongated, elliptical cross-sectional profile.

\* \* \* \* \*